US011829683B2

(12) United States Patent
Xu et al.

(10) Patent No.: US 11,829,683 B2
(45) Date of Patent: Nov. 28, 2023

(54) MONITORING DEVICE HAVING 360 DEGREE SENSING

(71) Applicant: Ecolink Intelligent Technology, Inc., Carlsbad, CA (US)

(72) Inventors: Rex Xu, Foothill Ranch, CA (US); Ashish Pradhan, Irvine, CA (US)

(73) Assignee: Ecolink Intelligent Technology, Inc., Carlsbad, CA (US)

( * ) Notice: Subject to any disclaimer, the term of this patent is extended or adjusted under 35 U.S.C. 154(b) by 408 days.

(21) Appl. No.: 17/123,770

(22) Filed: Dec. 16, 2020

(65) Prior Publication Data

US 2021/0103427 A1 Apr. 8, 2021

Related U.S. Application Data

(62) Division of application No. 15/933,916, filed on Mar. 23, 2018, now Pat. No. 10,884,104.

(60) Provisional application No. 62/608,024, filed on Dec. 20, 2017.

(51) Int. Cl.
| | |
|---|---|
| *G06F 3/00* | (2006.01) |
| *G06F 3/16* | (2006.01) |
| *G01S 7/481* | (2006.01) |
| *G06F 3/01* | (2006.01) |
| *G01S 17/08* | (2006.01) |
| *G01S 17/86* | (2020.01) |
| *G01S 17/89* | (2020.01) |

(52) U.S. Cl.
CPC .............. *G06F 3/167* (2013.01); *G01S 7/481* (2013.01); *G01S 17/08* (2013.01); *G01S 17/86* (2020.01); *G01S 17/89* (2013.01); *G06F 3/013* (2013.01)

(58) Field of Classification Search
USPC ........................................................ 356/4.01
See application file for complete search history.

(56) References Cited

U.S. PATENT DOCUMENTS

| | | | |
|---|---|---|---|
| 6,375,366 B1 | 4/2002 | Kato et al. | |
| 6,594,448 B2* | 7/2003 | Herman | G03B 37/00 396/21 |
| 7,492,423 B2* | 2/2009 | Endo | G02F 1/133615 349/61 |
| 7,869,129 B2 | 1/2011 | Lebreton | |

(Continued)

FOREIGN PATENT DOCUMENTS

| | | |
|---|---|---|
| EP | 3139584 A1 | 3/2017 |
| WO | 2007/041295 A2 | 4/2007 |
| WO | 2018/183067 A1 | 10/2018 |

OTHER PUBLICATIONS

ISA/US, Int. Search Report and Written Opinion issued on PCT application No. US18/52920, dated Nov. 26, 2018, 12 pgs.

(Continued)

*Primary Examiner* — James R Hulka
(74) *Attorney, Agent, or Firm* — Greenberg Traurig, LLP

(57) ABSTRACT

Aspects of the present invention are directed towards identifying users in a room by an intelligent personal assistant for automatic control of certain devices controlled by the assistant. The assistant may have a retractable, reflector that is used to identify persons in the vicinity of the assistant when the retractable, reflector is in an extended position. The retractable, reflector may additionally be stowed inside the assistant to stop processing visual information in the vicinity of the assistant.

14 Claims, 13 Drawing Sheets

(56) References Cited

U.S. PATENT DOCUMENTS

| | | | |
|---|---|---|---|
| 8,600,120 B2 | 12/2013 | Gonion et al. | |
| 9,098,467 B1 | 8/2015 | Blanksteen et al. | |
| 9,251,701 B2 | 2/2016 | Plagge et al. | |
| 9,684,227 B1 | 6/2017 | Smith et al. | |
| 10,102,359 B2* | 10/2018 | Cheyer | H04L 63/10 |
| 10,178,374 B2 | 1/2019 | Hudman et al. | |
| 10,417,405 B2* | 9/2019 | Cheyer | G06F 21/32 |
| 10,684,703 B2* | 6/2020 | Hindi | G06F 3/0346 |
| 10,726,715 B2* | 7/2020 | Hwang | G06F 1/1684 |
| 10,789,959 B2* | 9/2020 | Kajarekar | G10L 17/04 |
| 10,884,104 B2* | 1/2021 | Xu | G01S 7/481 |
| 11,009,970 B2* | 5/2021 | Hindi | G10L 25/78 |
| 11,200,898 B2* | 12/2021 | Gallagher | G06F 3/167 |
| 11,360,577 B2* | 6/2022 | Hindi | G06F 3/03547 |
| 2002/0146248 A1 | 10/2002 | Herman et al. | |
| 2006/0061695 A1 | 3/2006 | Endo | |
| 2006/0132939 A1* | 6/2006 | Blank | G01C 17/38 359/838 |
| 2008/0285138 A1* | 11/2008 | Lebreton | G02B 27/0149 359/630 |
| 2009/0135295 A1* | 5/2009 | Kunishige | H04N 5/235 348/E5.034 |
| 2009/0175509 A1* | 7/2009 | Gonion | G06V 40/164 382/118 |
| 2012/0206322 A1 | 8/2012 | Osterhout et al. | |
| 2012/0300099 A1* | 11/2012 | Watanabe | H04N 5/35572 348/231.3 |
| 2014/0080428 A1* | 3/2014 | Rhoads | G06F 16/9535 455/88 |
| 2014/0197922 A1* | 7/2014 | Stanwood | G06F 21/32 340/5.83 |
| 2014/0228124 A1* | 8/2014 | Plagge | G01S 17/46 398/107 |
| 2014/0282877 A1* | 9/2014 | Mahaffey | H04W 12/33 726/3 |
| 2015/0045003 A1* | 2/2015 | Vora | H04M 3/42042 455/412.2 |
| 2015/0116290 A1 | 4/2015 | Wheaton et al. | |
| 2015/0254333 A1* | 9/2015 | Fife | G06F 3/04842 707/748 |
| 2015/0341734 A1* | 11/2015 | Sherman | H04R 29/005 381/92 |
| 2015/0348548 A1* | 12/2015 | Piernot | G10L 15/26 704/235 |
| 2016/0162048 A1 | 6/2016 | David | |
| 2016/0171303 A1* | 6/2016 | Moore | A61F 9/08 901/1 |
| 2016/0260433 A1* | 9/2016 | Sumner | G06F 40/30 |
| 2016/0295197 A1 | 10/2016 | Hudman et al. | |
| 2016/0358600 A1* | 12/2016 | Nallasamy | G10L 15/07 |
| 2017/0140644 A1* | 5/2017 | Hwang | G06F 3/03 |
| 2017/0352350 A1* | 12/2017 | Booker | G10L 15/22 |
| 2017/0357478 A1* | 12/2017 | Piersol | G10L 15/30 |
| 2017/0357637 A1* | 12/2017 | Nell | G10L 15/22 |
| 2017/0357640 A1* | 12/2017 | Bellegarda | G06F 40/263 |
| 2017/0357716 A1* | 12/2017 | Bellegarda | G06F 16/3329 |
| 2017/0358300 A1* | 12/2017 | Laurens | G06F 3/167 |
| 2018/0070173 A1* | 3/2018 | Sherman | G10K 11/16 |
| 2018/0090143 A1* | 3/2018 | Saddler | G10L 13/02 |
| 2018/0319407 A1* | 11/2018 | Lisseman | B60W 50/14 |
| 2019/0187252 A1* | 6/2019 | Xu | G06F 3/167 |

OTHER PUBLICATIONS

EPO, extended European search report issued on European patent application No. 18892334.6, dated Sep. 20, 2021, 12 pgs.

* cited by examiner

MONITORING DEVICE HAVING 360 DEGREE SENSING

CROSS-REFERENCE TO RELATED APPLICATION

The present application is a divisional of U.S. patent application Ser. No. 15/933,916, filed on Mar. 23, 2018, which claims the benefit of U.S. provisional patent application Ser. No. 62/608,024, filed on Dec. 20, 2017, both of which are incorporated in their entirety herein.

BACKGROUND

Field of Use

The present application relates generally to the home automation and control arts. More specifically, embodiments of the present invention relate to interactions with intelligent personal assistants.

Description of the Related Art

Intelligent personal assistants are becoming commonplace in today's homes. Products such as Amazon's Echo, Google's Google Home, and Apple's Siri are all examples of these assistants. Typically, such assistants are installed at home, coupled to an existing home Wi-Fi network and placed in a convenient location where they may be used most frequently, such as in a family room or kitchen.

Generally, each device listens for a wake word to be spoken, such as "Alexa" for Amazon's Echo and "OK Google" for Google's Home device, followed by a question or a command. The question is typically sent over the Internet to a voice recognition server that interprets the question or command and provides a response that is sent back over the internet for verbal playback via a speaker that is typically integrated into each device, or causing some action to occur, such as lighting lights, playing music, etc.

One of the drawbacks of these assistants is that the wake word must be spoken each time a new question or command is asked by a user. This can become annoying, especially when a series of questions or commands are asked in succession.

It would be desirable to eliminate the need to utter the wake word every time a question is posed to such assistants.

SUMMARY

Embodiments of the present invention are directed towards identifying users in a room by an intelligent personal assistant for automatic control of certain devices controlled by the assistant. In one embodiment, a method is described, performed by an intelligent personal assistant, comprising reflecting light from an area around the intelligent personal assistant by a reflector into an interior of the intelligent personal assistant, receiving the reflected light from the reflector by a digital camera positioned inside the intelligent personal assistant and converting the light into electronic signals, receiving the electronic signals from the digital camera by a processor, determining, by the processor, an identity of a user in proximity to the intelligent personal assistant based on the digital video data, and causing, by the processor, an action to be performed based on the identity of the user.

In another embodiment, an intelligent personal assistant is described, comprising a memory for storing processor-executable instructions, a reflector for reflecting light from an area around the intelligent personal assistant to a camera, the camera, mounted inside a housing of the intelligent personal assistant, for providing digital video data of an area around the intelligent personal assistant from the light reflected from the reflector, a network interface for communicating with a local area network, and a processor coupled to the memory, the camera and the network interface, for executing the processor-executable instructions that causes the intelligent personal assistant to determine, by the processor via the camera, an identity of a user in proximity to the intelligent personal assistant based on the digital video data provided; and cause, by the processor, an action to be performed based on the identity of the user.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIG. 2b is a perspective view of an alternative embodiment of the intelligent personal assistant shown in FIG. 2a;

DETAILED DESCRIPTION

Embodiments of the present invention are directed towards a more natural way to interact with an intelligent personal assistant, by reducing or eliminating the need to utter a wake word or phrase.

Figure 1:
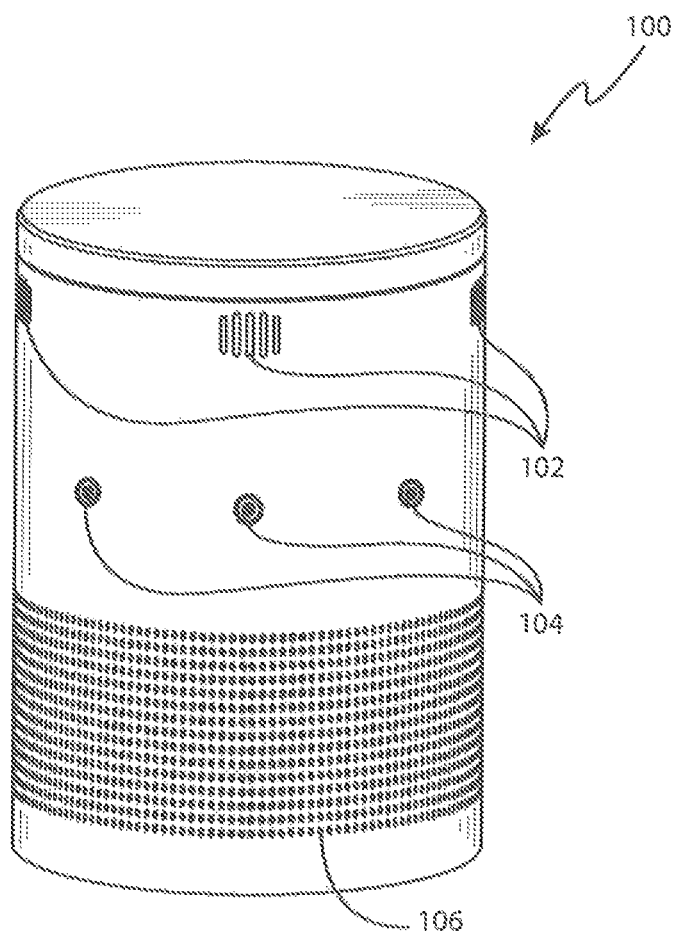
FIG. 1 is a perspective view of one embodiment of an intelligent personal assistant in accordance with the teachings herein.

FIG. 1 is a perspective view of one embodiment of an intelligent personal assistant 100, shown as a cylindrical unit comprising several cameras having camera lenses 102, several audio transducers 104 and a speaker 106 supported by amplification circuitry. The assistant 100 monitors for audio input received in a vicinity of the intelligent personal assistant in order to determine when a wake word or phrase is spoken (in one embodiment) and in order to provide audio information to a remote server for determining a question or a command from a user. Responses to questions are provided audibly by the intelligent personal assistant through speaker 106, as well as playing music. The intelligent personal assistant further comprises wireless networking circuitry to connect to a local area network and on to the Internet for communication with the remote server. Other uses for intelligent personal assistant 100 comprises ordering products, and controlling things such as lights, thermostats, security systems, etc. The intelligent personal assistant 100, in this embodiment, can determine when a user is addressing the assistant, so that the use of wake words and phrases can be minimized or eliminated entirely.

The remote server may provide Alexa Voice Services (AVS) to the intelligent personal assistant, which is a service offered by Amazon that analyzes audio information to determine if human speech is present in the audio information provided by the intelligent personal assistant, to interpret the speech, and to provide responses to the speech back to the assistant 100 over the Internet. Generally, the assistant 100 constantly listens for a wake word or phrase that must be spoken by a user in order to activate the assistant. For example, Amazon's Echo uses the wake word, "Alexa", while Google Home uses the wake phrase "Ok Google". When the assistant 100 determines that the wake word has been uttered, it records the next few seconds of audio information provided by the audio transducer(s) and then provides the recording to the remote server for processing. In prior art assistants, the wake word must be spoken each time an interaction with the assistant was desired. This typically becomes annoying after a series of interactions with the assistant.

In order to minimize or completely eliminate the need for a wake word, in one embodiment, assistant 100 utilizes one or more cameras 102 to determine when a user is addressing the intelligent personal assistant. The camera generates digital images and/or video and provides it to a processor that determines whether someone is addressing the assistant 100, for example, whether someone is addressing the assistant 100, for example by looking or "gazing" at assistant 100, and, in one embodiment, whether someone is looking or gazing at assistant 100 for more than a predetermined time period (such as two seconds), or, in another embodiment, whether someone is looking or gazing at assistant 100 as human speech is being received by the assistant. In one embodiment, the processor does not process the digital images/video, but rather provides this information from the camera(s) to a remote server for processing, much the same way that it provides audio information to a remote server.

In one embodiment, after the assistant 100 determines that a wake word has spoken, assistant 100 records a sample of following audio input received by the audio transducer(s) and provides the sample to the remote server, as well-known in the art. However, the wake word may additionally cause the intelligent personal assistant to begin processing digital images provided by the camera to determine if any follow-on voice input is provided by a user while the user looks at assistant 100. When further voice input is received as a user looks at assistant 100, assistant 100 records the voice input and sends it to the remote server for processing. A conversation between a user and assistant 100 may comprise multiple questions posed by a user in order to receive an acceptable answer. For example, the following exchange may occur:

User: "Alexa, what is the weather going to be like tomorrow?"
Echo: It will be 86 degrees and sunny tomorrow.
User: "How hot will it be at 6 pm?"
Echo" It will be 80 degrees at 6 pm tomorrow.
User: "Is there any chance of rain at all?
Echo: No, there is no chance of rain tomorrow at all.

As one can see, the above exchange is much more natural than having to speak the wake word each time a question is posed to assistant 100.

In another embodiment, a wake word is not used at all. In this embodiment, assistant 100 continuously monitors the area surrounding assistant 100 via the one or more cameras 102. When intelligent personal assistant 100 determines that a user is looking or gazing at assistant 100, assistant 100 begins recording audio information from the audio transducer(s), generally for a predetermined time period, such as five seconds, and then sends the audio recording to the remote server. Further verbal input from the user may be recorded and sent to the remote server any time that assistant 100 determines that a user is looking or gazing at assistant 100. Thus, a very natural "conversation" may be had between a user and assistant 100 without the use of a wake word or phrase.

In yet another embodiment, assistant 100 monitors both audio input from two or more audio transducers and digital images/video from the camera to determine when a user is attempting to communicate with assistant 100. In this embodiment, assistant 100 comprises two or more audio transducers, and typically a series of audio transducers formed along a circumference of assistant 100, in order to provide directionality to the audio input. Then, processing circuitry can determine an approximate location of a user as the user speaks to assistant 100. This can aid in determining whether the same user is still speaking to assistant 100. For example, assistant 100 may listen to audio input provided by eight audio transducers located around a circumference of assistant 100. When assistant 100 determines that a user is looking or gazing at assistant 100 for more than three seconds, assistant 100 records a sample of the audio input received by one or more of the audio transducers after determining that a user is looking or gazing at assistant 100. Assistant 100 additionally determines that the user is located approximately in alignment with audio transducer number seven of the eight audio transducers. This may be determined by measuring a signal strength of the audio provided by each of the audio transducers, and determining a user location using the strongest signal, or the top two or three strongest signals from adjacent audio transducers. Then, when assistant 100 again determines that someone is looking or gazing at assistant 100, assistant 100 determines whether the person looking at assistant 100 is in the same location as the previous determination. If so, assistant may use this information to better determine whether someone is addressing assistant 100 or not.

It should be understood that the number, type and arrangement of the camera lenses 102, audio transducers 104 and speaker 106 could be different than what is shown in FIG. 1. In some embodiments, however, it is advantageous to have some physical correspondence between the camera lenses 102 and the audio transducers 104, as will be explained later herein.

Figure 2A:
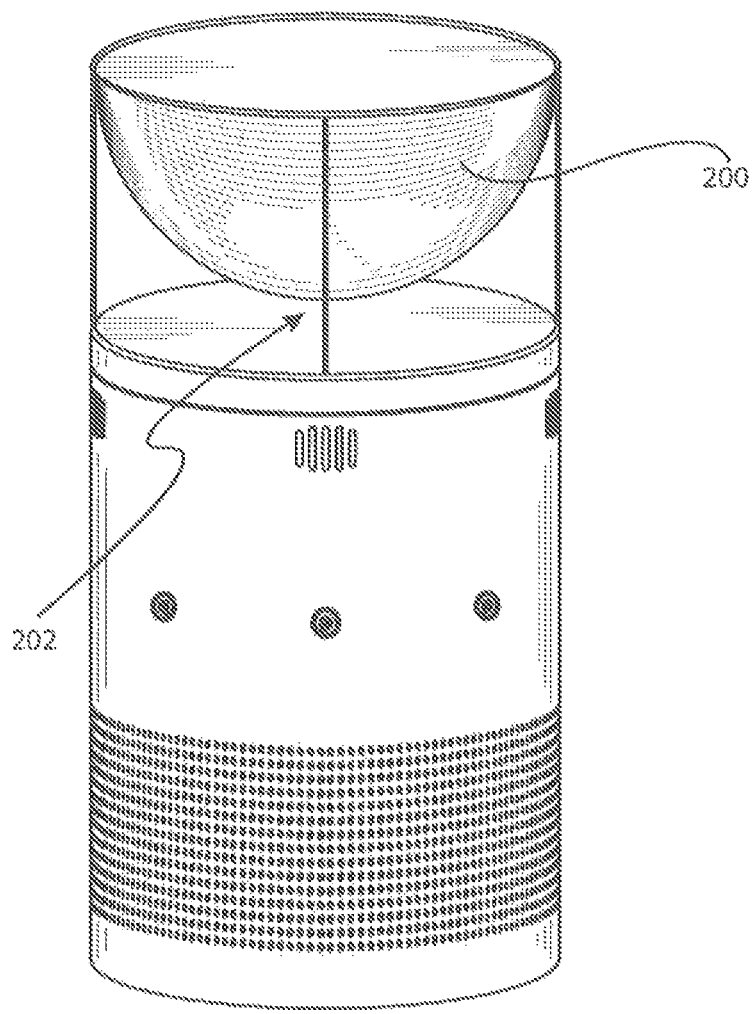
FIG. 2a is a perspective view of another embodiment of the intelligent personal assistant shown in FIG. 1.

FIG. 2a is a perspective view of another embodiment of the intelligent personal assistant 100 shown in FIG. 1. In this embodiment, intelligent personal assistant 100 is shown comprising a reflector 200 located at the top of the unit, in this embodiment shaped as a hemisphere or half-dome. In other embodiments, reflector 200 is parabolic in shape. In any case, the sloped nature of reflector 200 causes light from the area surrounding intelligent personal assistant 100 to be reflected downwards into the interior of intelligent personal assistant 100. A single camera is housed within intelligent personal assistant 100 pointing upwards toward an apex 202 of reflector 200. Reflector 200 is shown mounted to three mounting posts along a circumference, however, in other embodiments, it may be mounted using more, or fewer, mounting posts, and that in one embodiment, a single mounting post may be used, coupled to apex 202 and extending downwardly to the camera lens. In yet another embodiment, the circumference of the dome could be supported by a clear, cylinder, so that nothing obstructs light being reflected off of the dome. Reflector 200 is manufactured from any material that reflects light, such as metal or a mirrored surface, and is shaped to reflect light in an area surrounding the assistant 100 towards the camera. Thus, the camera is able to "see" in a 360 degree view around assistant 100.

Operation of this embodiment is similar to that described with respect to FIG. 1, except that the only source of visual information is from the single camera.

Figure 2B:
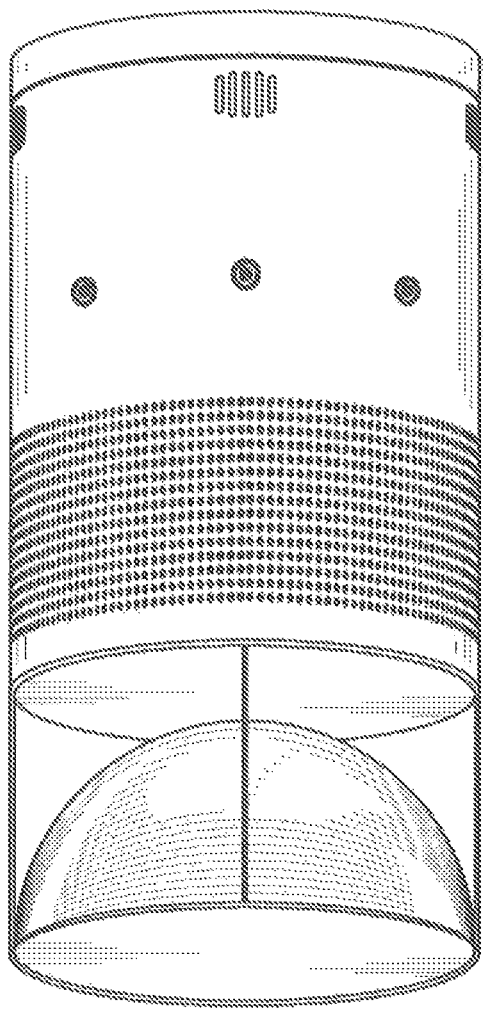

FIG. 2b is a perspective view of an alternative embodiment of the intelligent personal assistant shown in FIG. 2a. The intelligent personal assistant in this embodiment generally comprises the same components as intelligent personal assistant 100, except that reflector 200 is located near the bottom of the assistant, rather than the top, and the camera located inside of the assistant is pointing down towards reflector 200.

Figure 3:
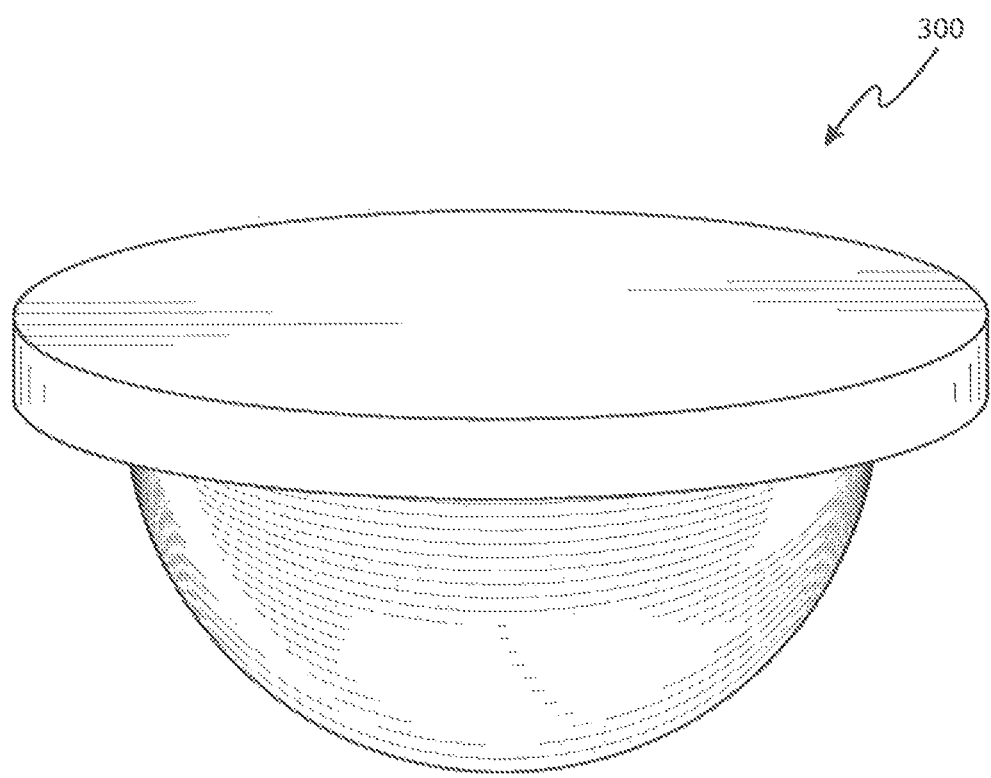
FIG. 3 is a perspective view of yet another embodiment of the intelligent personal assistant as shown in FIG. 1.

FIG. 3 is a perspective view of yet another embodiment of the intelligent personal assistant as shown in FIG. 1, this time an intelligent personal assistant 300 fashioned as a ceiling-mounted unit. As in the other embodiments, assistant 300 comprises one or more audio transducers for receiving audio input, a speaker for providing audio responses and one or more cameras. In one embodiment, a reflector is not used, as the camera may be capable of receiving light directly from all or a great majority of the area surrounding assistant 300. In one embodiment, the camera comprises a fish-eye lens.

Figure 4:
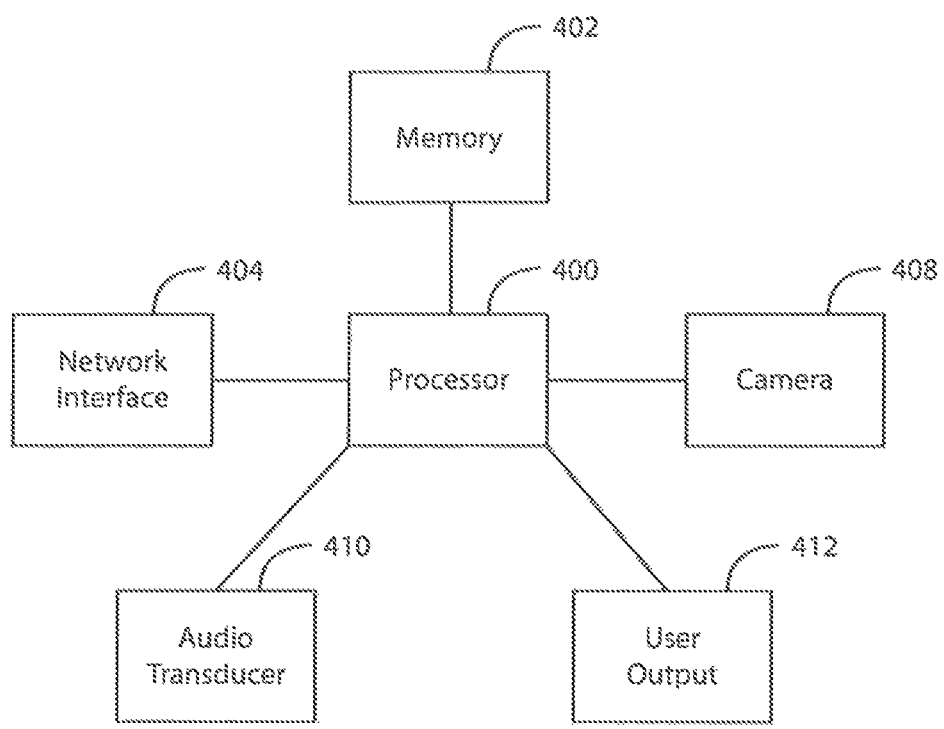
FIG. 4 is a functional block diagram of one embodiment of the intelligent personal assistants as shown in FIG. 1, 2a, 2b, or 3.

FIG. 4 is a functional block diagram of one embodiment of the intelligent personal assistants as shown in FIGS. 1, 2a and 2b. The same functional components are also used in the embodiment shown in FIG. 3, with the reflector omitted. FIG. 4 shows processor 400, memory 402, network interface 404, one or more audio transducers 406, one or more digital cameras 408, reflector 410 and user output 412. It should be understood that in some embodiments, some functionality has been omitted for purposes of clarity, such as a power supply.

Processor 400 comprises one or more general-purpose microprocessors, microcontrollers and/or custom or semi-custom ASICs, and/or discrete components able to carry out the functionality required for operation of the intelligent personal assistant. Processor 400 may be selected based on processing capabilities, power-consumption properties, and/or cost and size considerations. In the case of a microprocessor, microcontroller, or ASIC, processor 400 generally executes processor-executable instructions stored in memory 402 that control the functionality of the intelligent personal assistant. Examples of memory include one or more electronic memories such as RAM, ROM, hard drives, flash memory, EEPROMs, UVPROMs, etc. or virtually any other type of electronic, optical, or mechanical memory device, but excludes propagated signals.

Network interface 404 comprises circuitry necessary to transmit and receive digitized data packets comprising audio recordings from the one or more audio transducers 406 and/or visual recordings received by camera 410, between the intelligent personal assistant and a remote server over the Internet or other wide-area network, either directly or through a local network such as a router, modem, gateway, security panel, or other home-networked device(s). Such circuitry is well known in the art and may comprise BlueTooth, Wi-Fi, or RF circuitry, among others.

One or more audio transducers 406 comprise one or more devices used to convert sound pressure into electronic signals for use by processor 400. An example of such audio transducers are piezo-electric microphones, selected due to their inexpensive cost and small size. Another example are mems microphones.

Figure 9:
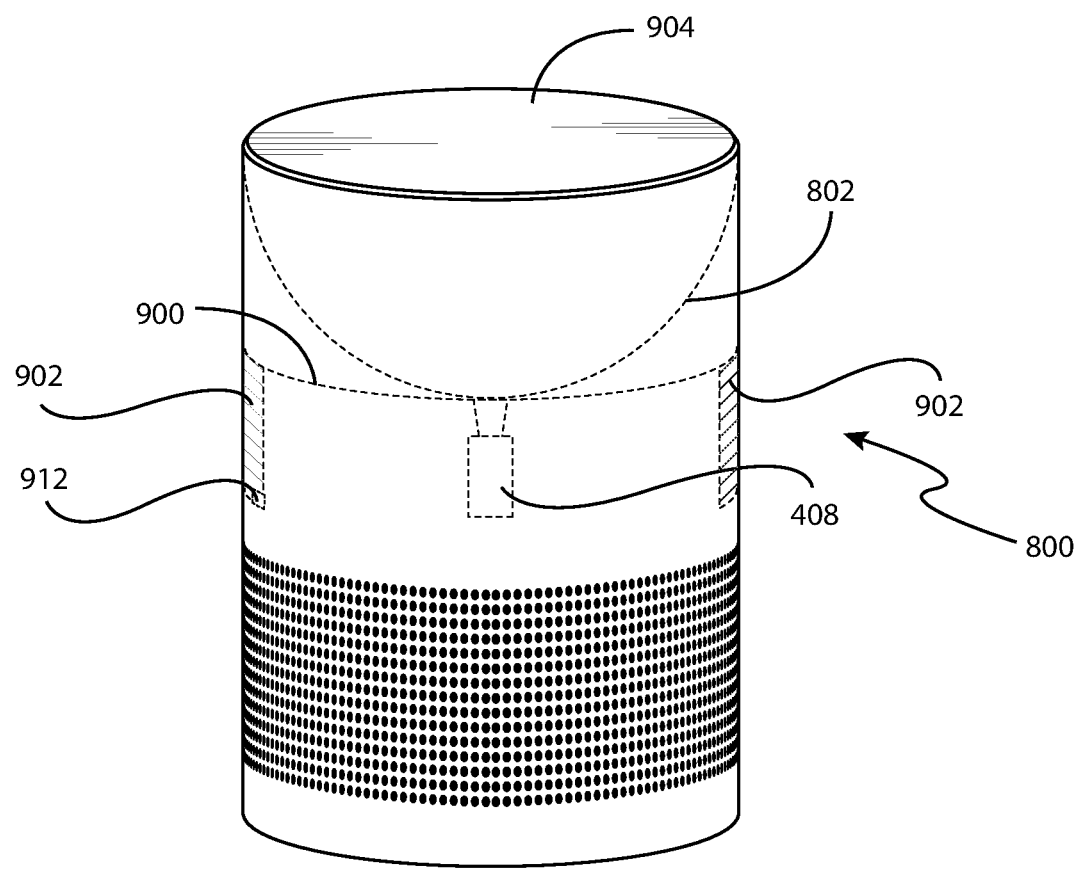
FIG. 9 is a perspective view of the intelligent personal assistant of FIG. 8, with the retractable reflector stowed inside of the intelligent personal assistant.

Digital camera(s) 408 comprises a device that converts light into electronic signals and provides the electronic signals to processor 400. A wide variety of inexpensive, high-quality cameras are available on the market today. As used herein, the term "camera" can mean, simply, a lens and an image sensor in combination. Such sensors are typically CMOS devices, and offer enough resolution to distinguish facial features at a distance of up to ten feet or more. Moreover, the subject devices may utilize a single sensor device in the form of color sensor, such as a 3-channel (RGB) photodiode sensitive to the blue, green and red regions of the spectrum, or an infrared sensor, such as a passive infrared sensor (PIR sensor) that measures infrared (IR) light radiating from objects in its field of view, in combination with the reflector 802 to determine the presence of users within an area of the intelligent personal assistant over 360 degrees. In this embodiment, the use of a color sensor or a passive infrared sensor has the advantage of providing an output (which may, in turn be provided to the cloud for processing as described above) in which the image information is generally physically distorted thus providing some privacy to the individuals being monitored. As shown in FIG. 9, camera 408 is mounted so as to face towards and centered under the apex of the reflector 802 to thereby provide the desired 360 degrees of uninterrupted coverage. In this example, the image information obtained by the sensor may be utilized to detect the presence of one or more people within the monitored space, identify how many people are within the monitored space, track the movement of people within the monitored space, determine the location of people within the monitored space relative to the personal assistant 100, etc. for the purposes described previously. In some cases, the sensors may also be capable of collecting information that is sufficient for the system to distinguish between persons within the monitored space and/or to determine if one or more persons are looking at the device again for the same purposes as described above. In this manner, this device may not only perform the functions noted above, but may also use the sensed presence of a user to simply turn on and off the device such that the device is not continually in a listening mode.

User output 412 comprises a speaker and related electronics and/or a video display for providing answers to users' questions or status information to a user. For example, a user may ask an intelligent personal assistant what the weather will be like the following day. In response, the intelligent personal assistant may audibly inform the user, via a speaker, that rain is likely in the forecast. In another example, if a user asks the intelligent personal assistant to play a particular song, and the intelligent personal assistant may play the song for the user via a speaker. If the user output additionally comprises a video display, the video display may indicate the song name, performer, album name, or other information related to the song.

Figure 5:
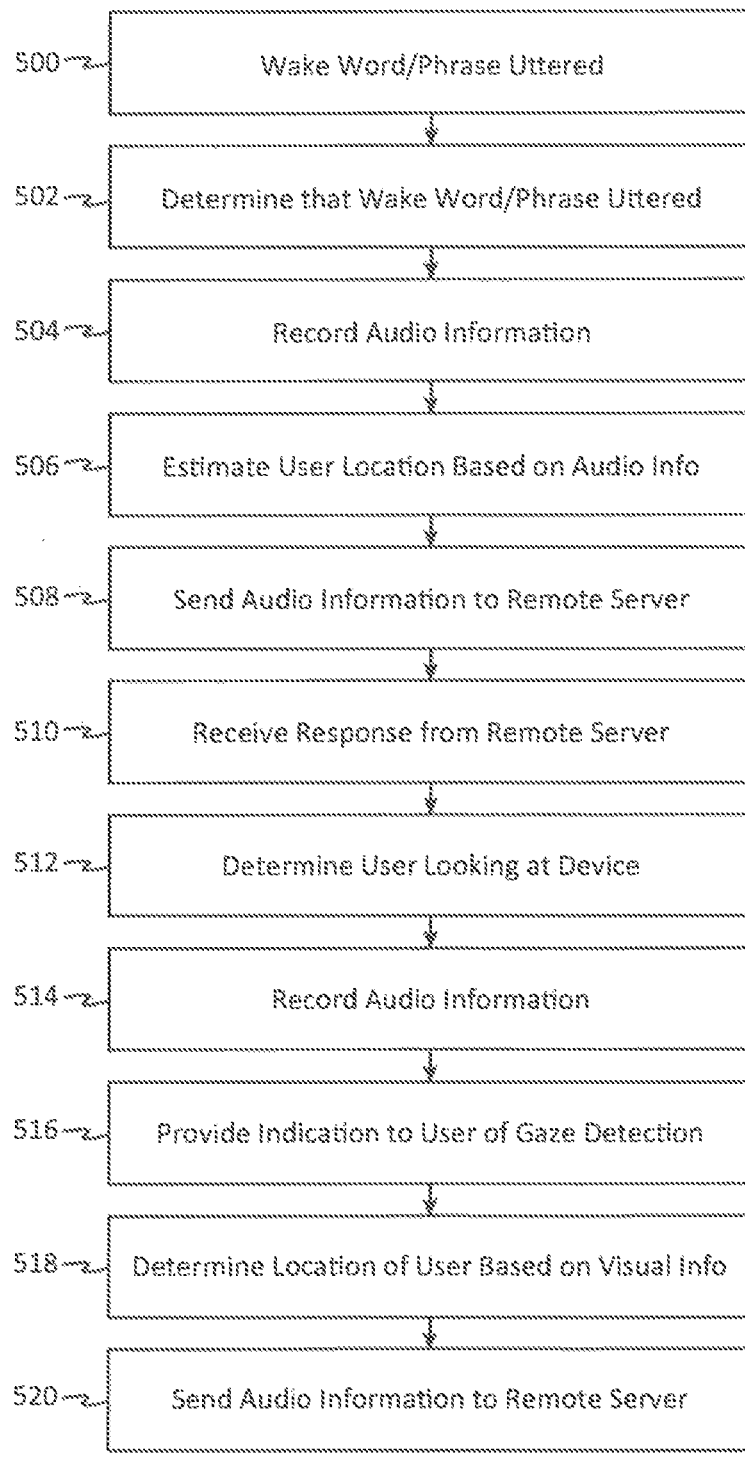
FIG. 5 is a flow diagram of one embodiment of a method, performed by an intelligent personal assistant as shown in FIG. 1, 2a, 2b, or 3, for interacting with a user in a more natural manner.

FIG. 5 is a flow diagram of one embodiment of a method, performed by an intelligent personal assistant, for interacting with a user in a more natural manner. It should be understood that the steps described in this method could be performed in an order other than what is shown and discussed and that some minor method steps may have been omitted for clarity and simplicity.

At block 500, a user of intelligent personal assistant in the vicinity of the intelligent personal assistant utters a wake word or phrase that is received by the one or more microphones and converted into an electronic signal representative of the wake work or phrase.

At block 502, processor 400 receives digitized audio information from the one or more microphones on the intelligent personal assistant and determines that the wake word or phrase was uttered by comparing the digitized audio information electronic to a wake word or phrase stored in memory 402, using techniques well-known in the art.

At block 504, in response to determining that a user uttered the wake word or phrase, processor 400 begins recording audio information from the one or more microphones and stores the audio information in memory 402. Typically, the audio information will comprise a question or a command from the user. The audio recording is generally terminated by processor 400 after a predetermined time period, such as five seconds, or upon determination by processor 400 that the user has stopped speaking, using techniques well-known in the art.

At block 506, processor 400 may estimate a location of the user in relation to the intelligent personal assistant using the audio information. For example, the intelligent personal assistant may comprise eight microphones lining a circumference of the intelligent personal assistant, each spaced equally apart from one another. Processor 400 may determine a signal strength of the audio information provided by each microphone, and use this information to determine a location of the user based on the strongest signal(s) from one or more of the microphones. For example, if microphone number 5 produced the strongest signal while either the wake word/phrase was spoken, or during a subsequent audio recording following detection of the wake word/phrase, processor 400 may conclude that the user is in an area adjacent to microphone number 5 or along an acoustic trajectory away from microphone number 5. In other embodiments, well-known microphone beamforming techniques may be used to estimate the location of a user.

At block 508, processor 400 causes the audio recording to be sent from memory 402 to a remote server via network interface 404, to determine whether the audio recording contains human speech and, if so, what the user has said, again using techniques well-known in the art. In another embodiment, the audio recording is processed locally by processor 400.

At block 510, the remote server then sends a response back to the intelligent personal assistant with an audible response and/or it provides a command to another cloud-based server for an action to occur at the location of the intelligent personal assistant. For example, if the user's voice recording was interpreted by the remote server to "turn on the kitchen lights", the remote server may send a command to another server via the Internet that is capable of remotely controlling the kitchen lights at the user's home. When the other server receives the command, it in turn sends a signal over the wide-area network to a control device inside the home for the device to turn the kitchen lights on. In an embodiment where processing is performed locally by processor 400, the response is provided by processor 400 to user output 412, in the case of an audible response or, in the case of causing an action to occur in the user's home, sends a signal to one or more networked home automation controllers or devices, to perform such actions such as turn on/off lights, set a thermostat, order goods online, etc.

At block 512, after a response has been provided to the user, visual information from the camera is evaluated in order to determine if the user, or someone else, is looking, or "gazing" at the intelligent personal assistant. In one embodiment, visual information is evaluated only for a predetermined time after the wake word or phrase was uttered, or within a predetermined time from when a response to the user's request or command following the wake word or phrase was provided. This embodiment utilizes the fact that a user is more likely to have a follow-on question or command immediately after receiving a response to his or her initial question or command, and that the user is likely looking at the intelligent personal assistant when a follow-up question or command is given.

In one embodiment, digital video and/or still images from the camera are evaluated by processor 400 to determine whether someone is looking or gazing at the intelligent personal assistant. In another embodiment, processor 400 causes the digital video and/or still images from the camera to be sent via network interface 404 to the same, or a different, server that processed the audio recording sent at block 510, in order to evaluate the visual information from camera 408. In either case, a determination may be made by determining whether two eyes and a mouth, representative of the presence of a person in the vicinity of the intelligent personal assistant, are present in the visual information. In one embodiment, an inverse function related to a curvature of the reflector is applied by processor 400, or the remote server, to the digital information from camera 408 to eliminate or reduce visual distortion caused by curvature of the reflector.

When the remote server determines that someone is looking or gazing at the intelligent personal assistant, the remote server sends a signal to the intelligent personal assistant via the Internet and network interface 404. In one embodiment, determining whether someone is looking or gazing at intelligent personal assistant comprises determining that someone is looking or gazing for more than a predetermined time period, such as two seconds. This makes it more likely that someone is intending to interact with the intelligent personal assistant, verses merely glancing at the intelligent personal assistant.

At block 514, when processor 400 determines, or is notified by the remote server, that someone is looking or gazing at the intelligent personal assistant, and in one embodiment, for more than a predetermined time period, processor 400 begins recording audio information from the one or more microphones and stores the audio information in memory 402. The recording is generally terminated by processor 400 after a predetermined time period, such as five seconds. In one embodiment, recording is stopped when processor 400 determines that someone has stopped speaking, using techniques well-known in the art. This may be used in conjunction with a predetermined time period. For example, the recording may be stopped upon detection that someone stopped speaking or a predetermined time period, whichever comes first. In one embodiment, the recording continues only for as long as the personal intelligent assistant is being addressed.

At block 516, also in response to determining that someone is looking or gazing at the intelligent personal assistant, processor 400 may provide an indication to the user that the intelligent personal assistant has determined that the user is looking or gazing at the intelligent personal assistant, in order to provide feedback to the user that the user's gaze has been acknowledged by the intelligent personal assistant. Knowing this, a user may pause to receive the indication before speaking to the intelligent personal assistant. The indication may comprise, simply, of illuminating an LED located on top of the intelligent personal assistant, for example.

At block 518, also in response to determining that someone is looking or gazing at the intelligent personal assistant, processor 400 may determine a location of the user in relation to the intelligent personal assistant using the visual information. For example, the intelligent personal assistant may comprise eight lenses lining a circumference of the intelligent personal assistant, each spaced equally apart from one another. Processor 400 may determine that two eyes and a mouth are present in signals provided by lenses 3 and 4. Thus, processor 400 may determine that the user is located along a line of sight of both lenses 3 and 4. In an embodiment where a reflector is used in conjunction with a single camera, the executable code that processes the images from the camera can comprise instructions that can determine a location of the user in relation to the intelligent personal assistant, based on, for example, a detection of two eyes and a mouth at a point along the 360 degrees of view.

At block 520, processor 400 causes the audio recording at block 514 to be sent from memory 402 to the remote server via network interface 404, to determine whether any human speech was uttered and, if so, what the user has said. In another embodiment, processing is conducted locally by processor 400.

In one embodiment, processor 400 sends the audio recording to the remote server only when the estimated user location determined by the visual information matches the estimated user location determined by the audio information when the key word/phrase was spoken. This helps ensure that a follow-up question or command is being spoken from the user who provided the original question/command in block 504, rather than a false signal as a result of someone else simply looking at the intelligent personal assistant.

Figure 6:
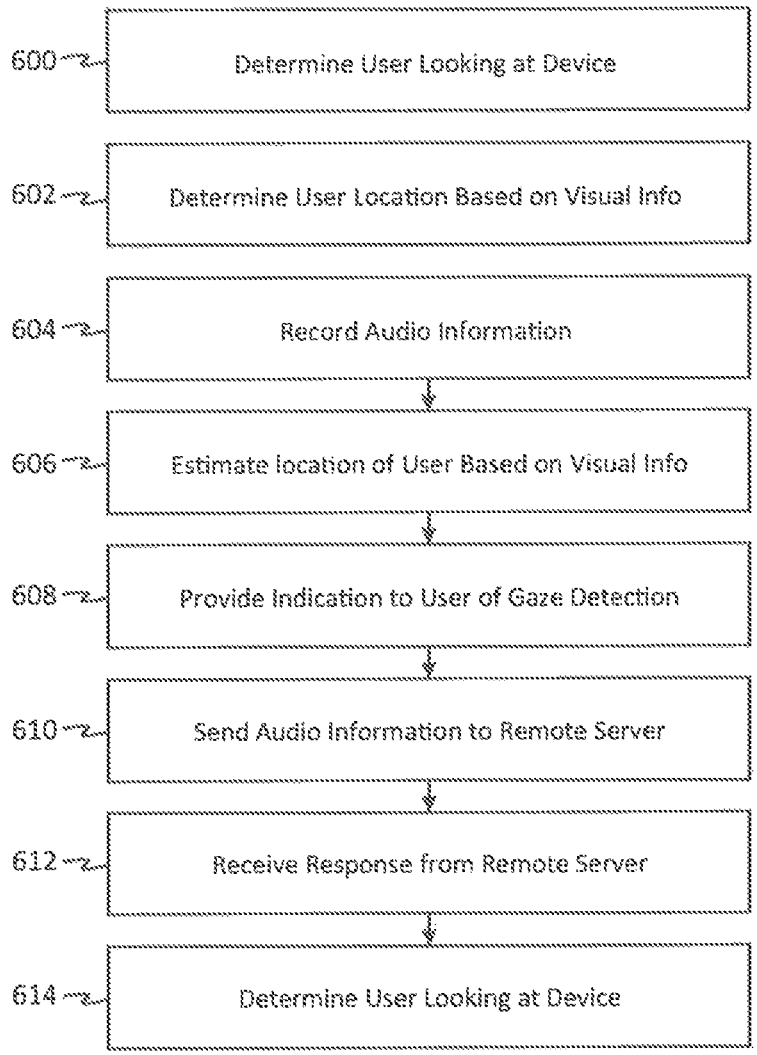
FIG. 6 is a flow diagram of another embodiment of a method, performed by an intelligent personal assistant as shown in FIG. 1, 2a, 2b, or 3, for interacting with a user in a more natural manner, without the use of wake words or phrases.

FIG. 6 is a flow diagram of another embodiment of a method, performed by an intelligent personal assistant, for interacting with a user in a more natural manner, without the use of wake words or phrases. It should be understood that the steps described in this method could be performed in an order other than what is shown and discussed and that some minor method steps may have been omitted for clarity and simplicity.

At block 600, processor 400 monitors digitized visual information from digital camera 408 to determine if anyone is looking or gazing at the intelligent personal assistant. In one embodiment, the digitized visual information comprises digital video and/or still images from the camera that are evaluated by processor 400. In another embodiment, processor 400 causes the digitized visual information from the camera to be sent via network interface 404 to the same, or a different, server that processed the audio recording sent at block 510, in order to evaluate the visual information from camera 408.

In one embodiment, processor 400 performs an inverse function related to a curvature of the reflector to the digitized visual information from camera 408 to eliminate or reduce visual distortion caused by curvature of the reflector.

When the remote server determines that someone is looking or gazing at the intelligent personal assistant, the remote server sends a signal to the intelligent personal assistant via the Internet and network interface 404. In one embodiment, determining whether someone is looking or gazing at intelligent personal assistant comprises determining that someone is looking or gazing for more than a predetermined time period, such as two seconds. In any case, a determination that someone is looking or gazing at the intelligent personal assistant may be made by determining whether two eyes and a mouth, representative of the presence of a person in the vicinity of the intelligent personal assistant, are present in the digitized visual information.

At block 602, processor 400 may determine a location of the user in relation to the intelligent personal assistant using the digitized visual information, as explained above with respect to the method illustrated in FIG. 5.

At block 604, when processor 400 determines, or is notified by the remote server, that someone is looking or gazing at the intelligent personal assistant, and in one embodiment, for more than a predetermined time period, processor 400 begins recording audio information from the one or more microphones and stores the audio information in memory 402. The recording is generally terminated by processor 400 after a predetermined time period, such as five seconds. In one embodiment, recording is stopped when processor 400 determines that someone has stopped speaking, using techniques well-known in the art. This may be used in conjunction with a predetermined time period. For example, the recording may be stopped upon detection that someone stopped speaking or a predetermined time period, whichever comes first. In one embodiment, the recording continues only for as long as the personal intelligent assistant is being addressed.

At block 606, processor 400 may estimate a location of the person who is addressing the intelligent personal assistant, as described above in the description to the method illustrated in FIG. 5.

At block 608, also in response to determining that someone is looking or gazing at the intelligent personal assistant, processor 400 may provide an indication to the user that the intelligent personal assistant has determined that the user is looking or gazing at the intelligent personal assistant, in order to provide feedback to the user that the user's gaze has been acknowledged by the intelligent personal assistant. Knowing this, a user may pause to receive the indication before speaking to the intelligent personal assistant. The indication may comprise, simply, of illuminating an LED located on top of the intelligent personal assistant, for example.

At block 610, processor 400 causes the audio recording to be sent from memory 402 to a remote server via network interface 404, to determine whether the audio recording contains human speech and, if so, what the user has said, again using techniques well-known in the art. In one embodiment, the audio recording is sent only when the location of the strongest audio signal from the microphone (s) matches the estimated location of a user via the visual information. This helps confirm that an actual question or command is being addressed to the intelligent personal assistant, rather than some random noise. In another embodiment, the audio recording is processed locally by processor 400 in order to determine whether the audio recording contains human speech and, if so, what the user has said.

At block 612, the remote server then sends a response back to the intelligent personal assistant with an audible response and/or it provides a command to another cloud-based server for an action to occur at the location of the intelligent personal assistant. For example, if the user's voice recording was interpreted by the remote server to "turn on the kitchen lights", the remote server may send a command to another server via the Internet that is capable of remotely controlling the kitchen lights at the user's home. When the other server receives the command, it in turn sends a signal over the wide-area network to a control device inside the home for the device to turn the kitchen lights on. In another embodiment, processor 400 sends an audible response to user output 412 and/or causes a signal to be transmitted via network interface 404 to other network-enabled devices or controllers, in order to perform such actions such as turning on/off lights, set thermostats, order goods online, etc.

At block 614, after a response has been provided to the user, processor 400 continues to evaluate, or have evaluated by the remote server, visual information from the camera in order to determine if the user is looking at the intelligent personal assistant. If so, blocks 604-612 are repeated.

Figure 7:
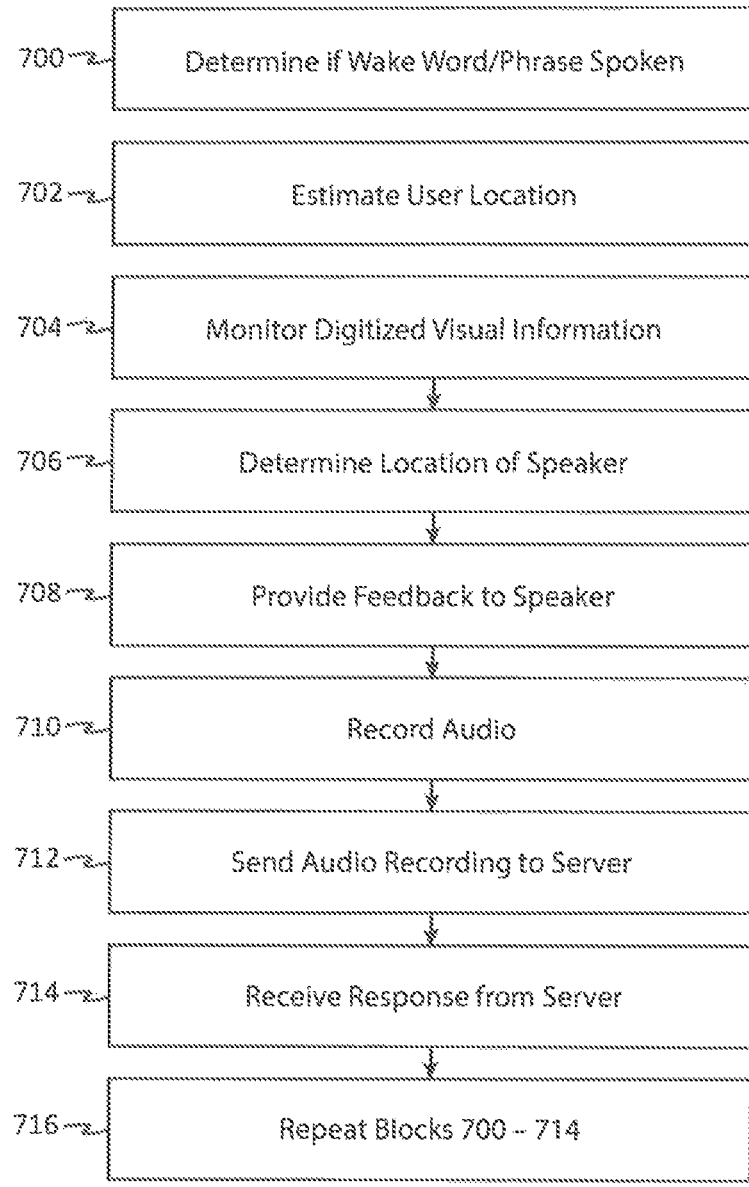
FIG. 7 is a flow diagram of yet another embodiment of a method, performed by an intelligent personal assistant as shown in FIG. 1, 2a, 2b, or 3, for interacting with a user in a more natural manner, using a combination of a wake word or phrase in combination with a determination that a user is addressing the intelligent personal assistant.

FIG. 7 is a flow diagram of yet another embodiment of a method, performed by an intelligent personal assistant as shown in FIG. 1, 2a, 2b, or 3, for interacting with a user in a more natural manner, using a combination of a wake word or phrase in combination with a determination that a user is addressing the intelligent personal assistant. This embodiment is useful to reduce the number of "false alarms" that may occur, for example, as a user is listening to a news or technical report describing an intelligent personal assistant. Often times, these reports audibly mention a key word or phrase in their discussions, which may cause a prior art intelligent personal assistant to react and, over a number times, become annoying. It should be understood that the steps described in this method could be performed in an order other than what is shown and discussed and that some minor method steps may have been omitted for clarity and simplicity.

At block 700, processor 400 receives digitized audio information from the one or more microphones on the intelligent personal assistant and determines that the wake word or phrase was uttered by comparing the digitized audio information electronic to a wake word or phrase stored in memory 402, using techniques well-known in the art.

At block 702, processor 400 may estimate a location of a user who uttered the wake word/phrase in relation to the intelligent personal assistant, as described above in the description to the method illustrated in FIG. 5.

At block 704, processor 400 monitors digitized visual information from one or more digital cameras 408 to determine if anyone is addressing the intelligent personal assistant, as described above in the description to the method illustrated in FIG. 5

At block 706, processor 400 may determine a location of the user who is addressing the intelligent personal assistant using the digitized visual information, as explained above with respect to the method illustrated in FIG. 5.

At block 708, also in response to determining that someone is looking or gazing at the intelligent personal assistant, processor 400 may provide an indication to the user that the intelligent personal assistant has determined that the user is looking or gazing at the intelligent personal assistant, in order to provide feedback to the user that the user's gaze has been acknowledged by the intelligent personal assistant. Knowing this, a user may pause to receive the indication before speaking to the intelligent personal assistant. The indication may comprise, simply, of illuminating an LED located on top of the intelligent personal assistant, for example.

At block 710, in response to determining that a user uttered the wake word or phrase, and that someone is addressing the intelligent personal assistant, processor 400 begins recording audio information from the one or more microphones and stores the audio information in memory 402. It should be understood that blocks 700 and 702 could be reversed. That is, processor 400 may determine, first, that a user is addressing the intelligent personal assistant using the visual information and then determine that a wake word or phrase has been uttered. In one embodiment, the recording commences when the wake word/phrase is uttered within a predetermined time from when the intelligent personal assistant was addressed, for example, one second. In one embodiment, the recording continues only for as long as the personal intelligent assistant is being addressed. In another embodiment, the recording is terminated after processor 400, or a remote server, determines that a user has stopped speaking. In one embodiment, the recording is commenced only when the estimated location of the person who uttered the wake word/phrase matches the estimated location based on the visual information, or vice-versa, in order to better ensure that the same person who uttered the wake word/phrase is the same person who is addressing the intelligent personal assistant.

At block 712, processor 400 causes the audio recording to be sent from memory 402 to a remote server via network interface 404, to determine whether the audio recording contains human speech and, if so, what the user has said, again using techniques well-known in the art. In another embodiment, the audio recording is processed locally by processor 400 in order to determine whether the audio recording contains human speech and, if so, what the user has said.

At block 714, the remote server then sends a response back to the intelligent personal assistant with an audible response and/or it provides a command to another cloud-based server for an action to occur at the location of the intelligent personal assistant, as explained above with respect to the method illustrated in FIG. 5.

At block 716, after a response has been provided to the user, blocks 700-714 are repeated.

Figure 8:
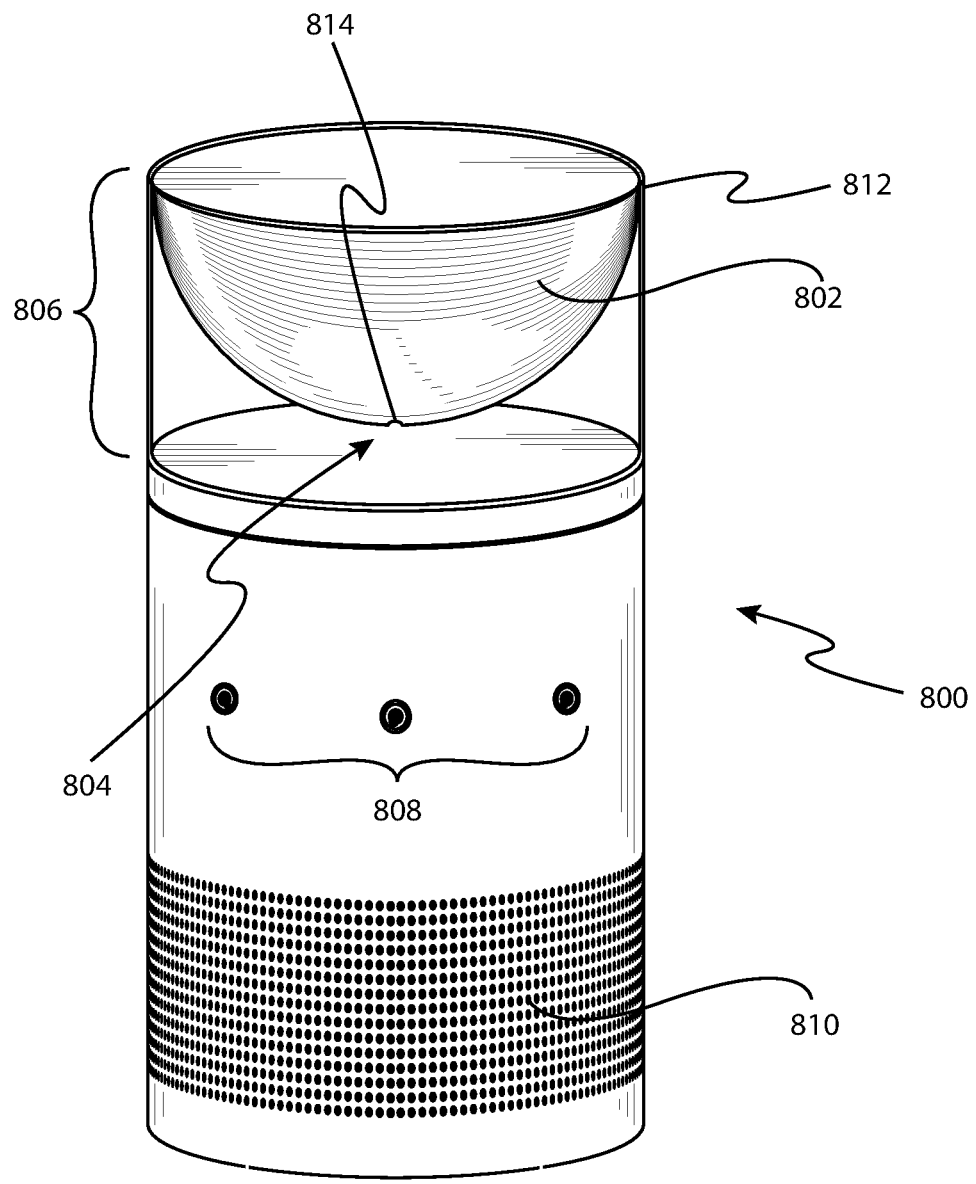
FIG. 8 is a perspective view of another embodiment of the intelligent personal assistant as shown in FIGS. 2A and 2B, featuring a retractable reflector.

FIG. 8 is a perspective view of another embodiment of an intelligent personal assistant 800, In this embodiment, intelligent personal assistant 800 is shown comprising a retractable, reflective reflector 802 located on top of the unit, shaped as a hemisphere or half-dome. In other embodiments, reflector 802 is parabolic in shape. In any case, the sloped nature of reflector 802 causes light from the area surrounding intelligent personal assistant 800 to be reflected downwards into the interior of intelligent personal assistant 800. As in other embodiments, a camera is housed within intelligent personal assistant 800 pointing upwards toward an apex 804 of reflector 802, and intelligent personal assistant 800 further comprises one or more audio transducers 808 and one or more speakers 810. The audio transducer(s) receives audio input from a user in proximity to intelligent personal assistant 800 and converts the audio input into electronic signals for use by a processor within intelligent personal assistant 800. The audio input is typically questions or commands from a user, the commands typically asking intelligent personal assistant 800 to control certain electronic devices coupled to intelligent personal assistant 800 via a local area network, such as a home Wi-Fi network. For example, a user may ask intelligent personal assistant 800 to turn on one or more lights, turn a TV on or off, are or disarm a home security system, etc.

Reflector 802 comprises a spherical structure with a reflective coating or made from reflective material, to allow camera 408 to view 360 degrees around an intelligent personal assistant. In one embodiment, reflector 802 comprises a sphere, which may add to the aesthetic appearance of the intelligent personal assistant. Camera 408 is positioned either below or above reflector 802, pointed directly upwards, or downwards, depending on implementation, towards reflector 802, which enables camera 408 to receive light reflected from around the assistant in 360 degrees, unobstructed by any mechanisms to support reflector 802.

Reflector 802 is shown mounted inside a rigid, transparent support structure 806, in this embodiment, in the shape of a short, clear cylinder, so that nothing obstructs light from reaching reflector 802. Reflector 802 is manufactured from any material that reflects light, such as metal or a mirrored surface, and is shaped to reflect light in an area surrounding the assistant 800 towards the camera. Thus, the camera is able to "see" in a 360 degree view around assistant 800 without obstruction. Generally, reflector 802 comprises a rigid, transparent support structure 806 comprises a rigid, clear material such as glass, Lucite®, one or more of a wide variety of clear plastics, etc. In one embodiment, during construction of intelligent personal assistant 800, a cylindrical mold is partially filled with liquefied or gelatinous clear material which, when cool, forms rigid, transparent support structure 806. While the clear, rigid support structure is in the liquefied or gelatinous state, reflector 802 is placed into the cylindrical mold, with apex 804 in a downfacing position. When the liquefied or gelatinous cools, reflector 802 is secured within and to the clear, rigid material. In another embodiment, transparent support structure 806 is formed with a depression sized and shaped to receive reflector 802. Then, reflector 802 is placed into the depression and secured in place by traditional methods, such as clear adhesive, screws, rivets, clips, etc. In yet another embodiment, reflector 802 is formed by first forming structure 806 with a depression formed into a top of structure 806 resembling reflector 802, and then coating this surface with reflective material, such as quicksilver, paint, or the like, or reflective metal.

The various components of intelligent personal assistant 800 are generally the same components as the intelligent personal assistant shown in FIGS. 1-2, shown as functional block diagrams as shown in FIG. 4.

FIG. 9 is a perspective view of the intelligent personal assistant 800 of FIG. 8, with reflector 802 stowed inside of intelligent personal assistant 800. Some of the features as shown in FIG. 8 have been omitted for clarity. In this view, rigid, transparent support structure 806 has been pushed downward by a user, inside the housing of intelligent personal assistant 800. This is typically accomplished by the user pressing downward on surface 904 while intelligent personal assistant 800 is in the position as shown in FIG. 8, until rigid, transparent support structure 806 reaches the position as shown in FIG. 9. Rigid, transparent support structure 806 is held into either an extended position, as shown in FIG. 8 or a retracted position, as shown in FIG. 9, by one or more spring-loaded, push-to-lock mechanisms 902. Push-to-lock mechanisms 902 typically comprise a spring acting on an extension that pushes against rigid, transparent support structure 806, causing it to extend into the position as shown in FIG. 9. The spring is coiled as a user presses downward on surface 904 and when rigid, transparent support structure 806 reaches a point just below that as shown in FIG. 9, a locking mechanism of push-to-lock mechanism 902 is engaged, holding structure 806 in place. To extend structure 806, a user pushes down on surface 904, thus releasing the locking mechanism inside push-to-lock mechanism 902, causing the spring and extension to push structure 806 upwards into the extended position. In one embodiment, push-to-lock mechanism 902 further comprises a dampening mechanism that causes structure 806 to more slowly move from the stowed position to the extended position. Push-to-lock mechanism 902 is a well-known mechanical device in the art.

Digital camera 408 is shown in hidden lines in FIG. 9, mounted in a fixed position, pointing upwards towards an apex of reflector 802. Camera 408 converts light reflected from reflector 802 into digital signals for processing by processor 400. When structure 806 is stowed, reflector 802 cannot receive light from the area surrounding intelligent personal assistant 800. When structure 806 is extended, camera 408 receives light from the area surrounding intelligent personal assistant 800. Structure 806 is configured to position reflector 802 a predetermined distance from digital camera 408 such that images captured by camera 408 are in focus.

In one embodiment, when structure 806 is in the stowed position, processer 400 stops processing information from camera 408, either by processor 400 ignoring further information from camera 408, by camera 408 ceasing to provide digital signals to processor 400. Processor stops processing information when it receives a signal from a mechanical, optical, or magnetic switch 912 located within intelligent personal assistant 800 and activated when structure 806 is stowed, typically by mechanical interaction with the extension and switch 912, or by direct interaction between structure 806 and switch 912.

In one embodiment, when a user presses on surface 904 to stow or retract reflector 802, camera 408 may record a fingerprint from the user as the user presses downward on surface 904. In this embodiment, surface 904 is made from a rigid, transparent material such as clear plastic or glass, and switch 912 (or some other switch capable of detecting when reflector 802 is being moved by a user) is used to detect movement of reflector 802 by a user. Processor 400 receives a signal from switch 912 during movement of reflector 802, and processor 400 records one or more images and/or video of the user's finger or thumb pressing downwards on surface 904 via aperture 814 formed into apex 804. Aperture 814 is small enough not to substantially alter the light reaching camera 408, but large enough to allow camera 408 to view a user's finger or thumb when it pushed downward on surface 904. In one embodiment, where reflector is six inches in diameter, the diameter of aperture 814 is typically between one-half inch and one inch.

When processor 400 captures an image of a user's finger or thumbprint, processor 400 may compare the image to one or more images stored in memory 402 to determine if the user is authorized to stow or retract reflector 802, as stowing reflector 802 prevents intelligent personal assistant 800 from processing visual information in the vicinity of intelligent personal assistant 800. Users may pre-store one or more fingerprints during setup of intelligent personal assistant 800 (or during a "learn" mode, where intelligent personal assistant 800 stores images/fingerprints of authorized users)

where processor 400 stores the images in memory 402. The fingerprints may be stored in association with an image of a user, or with attributes determined by processor 400 as a result of processing images of the user. If processor 400 determines that an un-registered user is stowing or retracting reflector 802, for example, no match is found between user fingerprint images captured during stowage/retraction to pre-stored fingerprint images in memory 402, processor may generate an alert and send it to network interface 404, alerting an authorized user that an un-authorized person is operating intelligent personal assistant 800. The alert may be addressed to a pre-registered user (i.e., a person who has previously submitted at least one fingerprint during setup of intelligent personal assistant 800) by retrieving an email address, telephone number, or some other information used to contact a user), and then addressing the alert using the contact information stored in memory 402.

Figure 10:
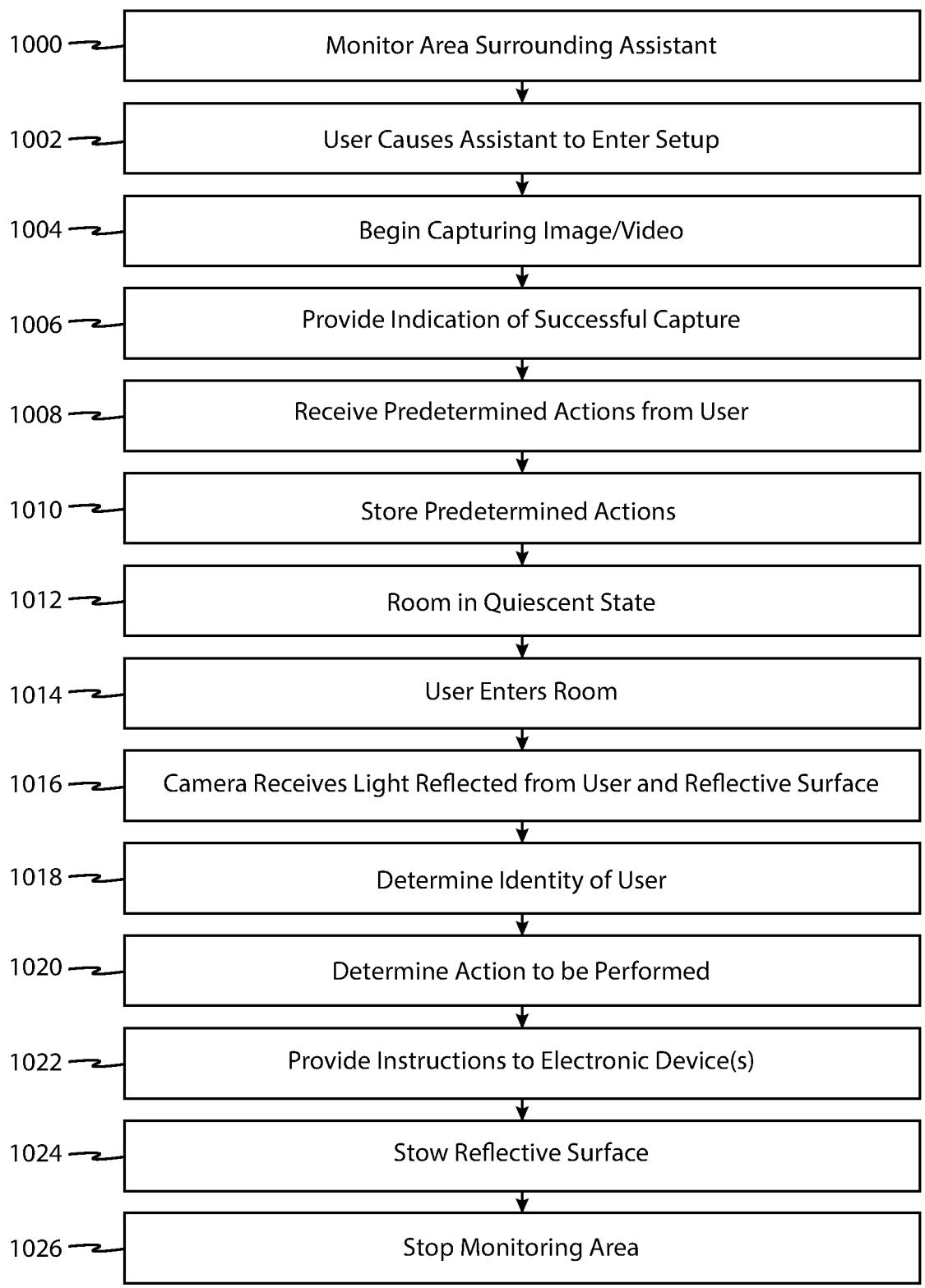
FIG. 10 is a flow diagram of a method performed by an intelligent personal assistant as shown in FIGS. 8 and 9, for interacting with a user.

FIG. 10 is a flow diagram of a method, performed by intelligent personal assistant 800, for interacting with a user. The method begins as intelligent personal assistant 800 is in an extended position and has been preprogrammed to interact with at least one electronic device over a local area network, i.e., to turn at least one electronic device on or off. It should be understood that the steps described in this method could be performed in an order other than what is shown and discussed and that some minor method steps may have been omitted for clarity and simplicity.

At block 1000, processor 400 monitors an area surrounding intelligent personal assistant 800 by processing digitized video or images from camera 408. Generally, camera 408 captures image information in an unobscured, 360 degree view around intelligent personal assistant 800 due to reflective reflector being suspended inside structure 802.

At block 1002, a user enters a room where intelligent personal assistant 800 is located, and the user may instruct intelligent personal assistant 800 to enter a setup or "learn" mode of operation, causing intelligent personal assistant 800 to remember visual features of the user's face and/or body for future reference. In one embodiment, the user may cause intelligent personal assistant 800 to enter the setup or learn mode using a predetermined voice command in connection with a wake word. In another embodiment, the user may use an app on a mobile device such as a smart phone or tablet computer to wireless transmit a command to place intelligent personal assistant 800 into the setup or learn mode.

In one embodiment, only the lower portion of a user's body is recorded for future reference to identify persons in the room where intelligent personal assistant 800 is located. In this embodiment, camera 408 may only be capable of viewing the lower portion of a user's body, especially if the user is close to intelligent personal assistant 800, due to the inherent nature of a half-dome generally being limited to reflecting light at a height of the upper-most portion 812 of reflector 802 or below.

At block 1004, after intelligent personal assistant 800 has entered the setup or learn mode, the user may face intelligent personal assistant 800 so that processor 400 may capture one or more images or video of the user via camera 408. The image or video information may be stored in memory 402 or provided to a server for storage over the local area network and the Internet. Processor stores this information in association with an identity of the user, which is typically provided by the user prior to, during or after processor 400 has captured the image of video information of the user. In another embodiment, processor may determine certain physical characteristics of the user, such as an approximate height or weight of the user, the user's eye color, hair color, skin tone, presence or absence of facial hair, or other distinguishing physical characteristics from the images and/or video and store this information, rather than raw visual information. In another embodiment, only a portion of a user is recorded in an embodiment where light cannot be reflected by reflector 802 at a height greater than an upper-most portion 812 of reflector 802. Thus, later user identification is performed using information not associated with a user's head, such as using only a user's leg length, waist size, garments, gait, etc. as factors in identifying a user.

At block 1006, processor 400 may provide an indication to the user that the image/video capture/identification process has been completed by causing user output 412 to sound a predetermined tone or other audio signal, and/or to cause one or more lights to become illuminated on an exterior surface of intelligent personal assistant 800.

At block 1008, processor 400 may receive instructions from the user to cause one or more predetermined actions to occur when intelligent personal assistant 800 identifies the presence of the user in proximity to intelligent personal assistant 800. One or more electronic devices may be electronically coupled to intelligent personal assistant 800 via a local area network, such as a home Wi-Fi network, and the instructions may comprise commands to operate or control one or more functions of one or more of these electronic devices. For example, a Wi-Fi enabled stereo and television may be electronically coupled to intelligent personal assistant 800, and the instructions could comprise a voice command from the user to turn both the stereo and the TV on, to set the stereo to accept audio information from the TV, and to set the stereo at a certain volume. The user may, as another example, provide instructions to disarm a home security system, or to change an operating mode of such a home security system, such as from "Armed-Away" to "Armed-Home". In another example, an HVAC system could be coupled to intelligent personal assistant 800, and the instructions could comprise instructions that cause the HVAC system to set the temperature of the room where intelligent personal assistant 800 is located to a predetermined temperature.

At block 1010, processor 400 stores the instructions in memory 402 and associates the instructions with the image/video information received at block 1004.

At some time later, at block 1012, when most or all of the electronic devices in the room where intelligent personal assistant 800 is located are in the off position, and structure 806 is in an extended position, camera 408 monitors the area around intelligent personal assistant 800 by receiving unobstructed light from the area surrounding intelligent personal assistant 800 to detect when someone has entered the room.

At block 1014, the user enters the room.

At block 1016, camera 408 receives light reflected from reflector 802, capturing the user soon after entering the room. Camera 408 converts the light into one or more digitize images/video and provides it to processor 400.

At block 1018, processor 400 determines an identity of the user that entered the room by comparing the digitized images/video to previously-stored images/video of one or more users at block 1004 using known image comparison techniques. In another embodiment, processor 400 sends the captured image/video information to a remote sever via, for example, the local area network and the Internet, where the remote server performs the identity of the user by comparing the image/video data to previously provided image/video data using known image comparison techniques.

At block 1020, if the identity of the user is determined, processor 400 determines one or more actions to perform, based on the instructions from the identified user as provided at block 1008.

At block 1022, processor 400 provides one or more instructions or commands to one or more electronic devices coupled to intelligent personal assistant 800 via a local area network. In response, the one or more electronic devices perform an intended function, such as to turn one or more lights on or off, set the room temperature to a predetermined temperature, open or close blinds, set a stereo and/or TV to predetermined settings, such setting the stereo to receive a certain music stream, or setting the TV to a predetermined channel.

At block 1024, at any time, a user may wish to stow structure 806, so that intelligent personal assistant 800 no longer processes visual information in the vicinity of intelligent personal assistant 800. The user may stow structure 806 to allow the user more privacy, i.e., knowing that visual information is not being processed by intelligent personal assistant 800 or by a server in a remote location over the Internet. However, audio input 808 may still monitor the area surrounding intelligent personal assistant 800 for audible queries or instructions from a user.

At block 1026, processor 400 detects that structure 806 has been stowed, as indicated by switch 912. In response, processor 400 stops processing signals from camera 408, and/or camera 408 is disabled from providing digitized images/video to camera 408.

Figure 11:
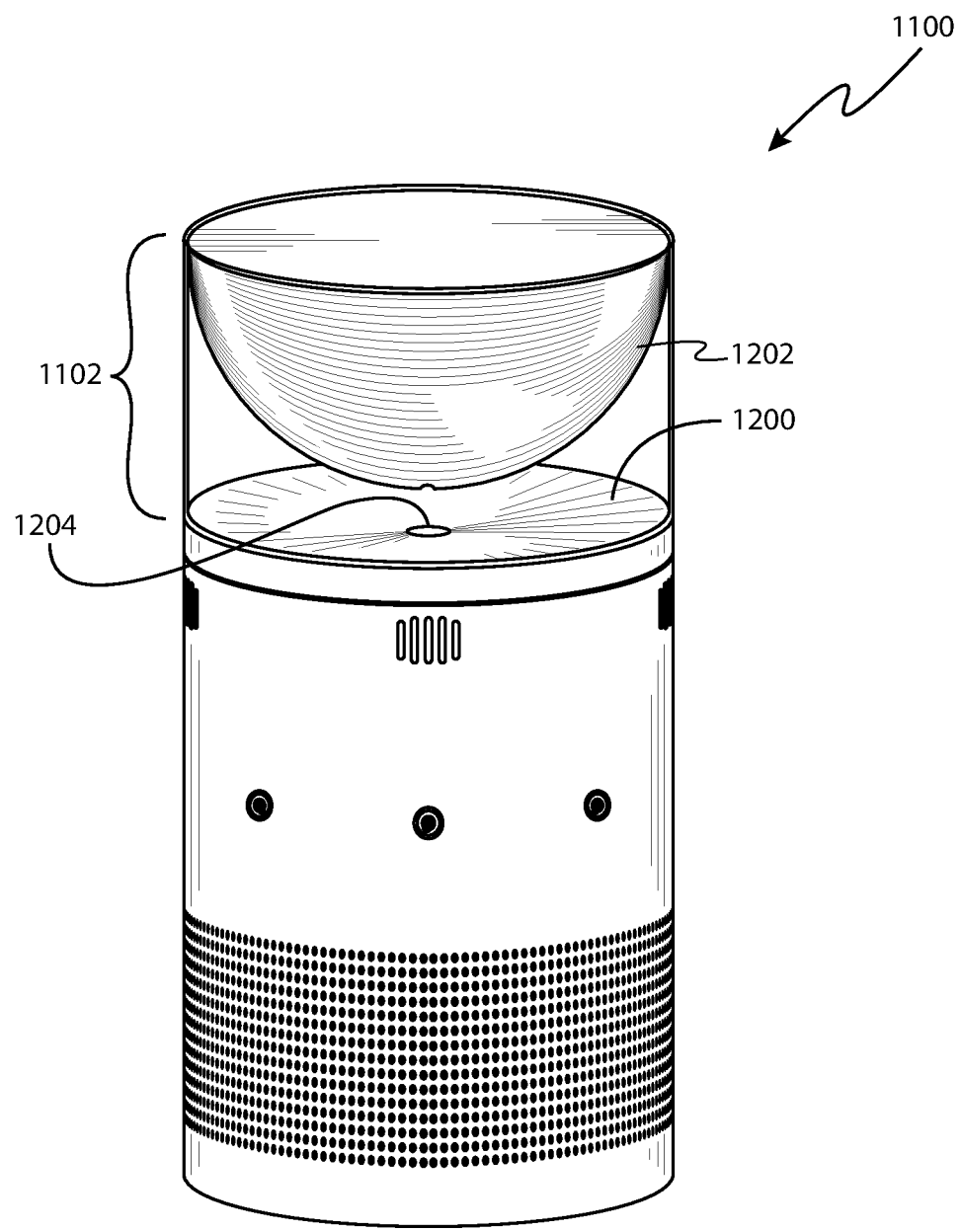
FIG. 11 is a perspective view of yet another embodiment of an intelligent personal assistant.

FIG. 11 is a perspective view of yet another embodiment of an intelligent personal assistant. In this embodiment, intelligent personal assistant 1100 is similar to the intelligent personal assistant as shown in FIGS. 2A and 2B, with the exception of reflector 200 being replaced by a pair of reflectors 1102. In one embodiment, reflector 1102 comprises a primary, parabolic reflector 1200 and a secondary, hyperbolic reflector 1202. Light from the area surrounding intelligent personal assistant 1100 is reflected down through through-hole 12046 into intelligent personal assistant 1100. A camera centrally mounted inside intelligent personal assistant 1100 and pointing upward captures the light, similar to the embodiments shown in FIGS. 2A, 2B, 8 and 9. Further details of reflector 1102 is provided below.

Figure 12:
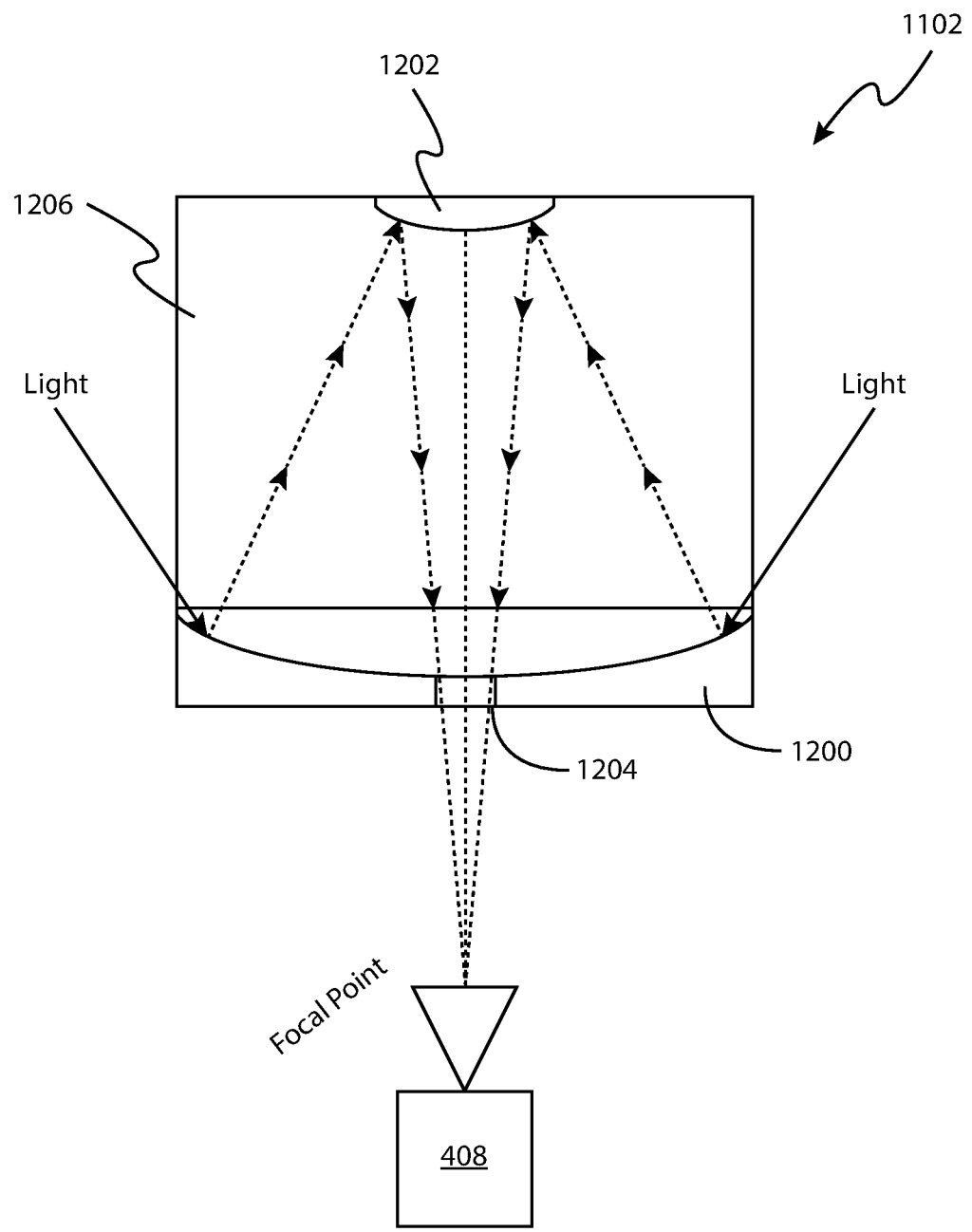
FIG. 12 is a close-up, side, cutaway view of a reflector as used in the embodiment as shown in FIG. 11.

FIG. 12 illustrates reflector 1102. Reflector 1102 comprises a primary, parabolic reflector 1200 and a secondary, hyperbolic reflector 1202 spaced apart from each other. In this embodiment, secondary reflector 1202 is shown as being smaller than secondary reflector 1202 shown in FIG. 11. Primary reflector 1200 comprises through-hole 1204 located at the center of primary reflector 1200 that allows light from secondary reflector 1202 to pass to camera 408. The surfaces of primary reflector 1200 and secondary reflector 1202 are reflective, comprising quicksilver, paint, or the like, or reflective metal. In one embodiment, secondary reflector 1202 is suspended above primary reflector 1200 by forming a transparent cylinder 1206 and coupling primary reflector 1200 to one end and secondary reflector 1202 to the other end, or by forming one end of the transparent cylinder in a parabolic shape and at least a portion of the opposing end in a hyperbolic shape, and then coating these shapes with a reflective material.

In operation, light from an area surrounding intelligent personal assistant 1100 passes through transparent cylinder 1206 and reflected off of primary reflector 1200, where it is focused on secondary reflector 1202. Secondary reflector 1202, in turn, focuses the light downwards through through-hole 1204, to camera 408. While the light striking camera 408 may be distorted due to the parabolic and hyperbolic reflectors, software executed by processor 400 can be used to remove the distortion enough to enable processor 400 to make visual comparisons of persons in a room where intelligent personal assistant 1100 to stored images and/or information pertaining to such persons. Finally, similar to the embodiment shown in FIGS. 8 and 9, transparent cylinder 1206 may be stowed inside intelligent personal assistant 1100 by mounting transparent cylinder 1206 to a mechanism that allows for such stowage.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method, performed by a device coupled to a digital camera, a microphone, a network interface for communicating with a local area network, and a speaker, comprising:
   receiving via use of the digital camera an image data;
   determining from the image data that a user is gazing at the device;
   receiving via use of the microphone an audio utterance from the user; and
   providing the audio utterance to a cloud-based server via use of the network interface for processing without regard to whether a wake word was provided to the device via use of the microphone within a first period of time prior to the audio utterance being received by the device when the audio utterance is received by the device during a second period of time that includes the user having been determined to be gazing at the device.

2. The method of claim 1, further comprising:
   prior to determining that a user is gazing at the device:
   monitoring a data received via the microphone for utterance of a wake word;
   determining from the data that the user has uttered the wake word; and
   providing via use of the speaker a response to a phrase spoken by the user and received via the microphone after the user has uttered the wake word.

3. The method of claim 2, wherein the second period of time comprises
    a predetermined amount of time measured from the providing of the response.
4. The method of claim 1, wherein determining that a user is gazing at the device comprises:
    determining the presence of two eyes and a mouth within the image data.
5. The method of claim 1, wherein the second period of time comprises
    a predetermined amount of time.
6. The method of claim 1, where the device is coupled to an output device and the method further comprises:
    providing an indication to the use via the output device that the device is listening for a further audio utterance.
7. The method of claim 1, wherein receiving the audio utterance from the user comprises:
    monitoring a data received via the microphone for a further audio utterance within a predetermined time after determining that the user is gazing at the intelligent personal assistant;
    when the predetermined time has elapsed without receipt of the further audio utterance, requiring the wake word to be re-provided to the device before allowing the device to provide any subsequently received audio utterance to the cloud-based server via use of the network interface for processing.
8. A device, comprising:
    a digital camera;
    a microphone;
    a network interface for communicating with a local area network;
    a memory for storing processor-executable instructions; and
    a processor coupled to the memory, the digital camera, the network interface and the microphone, for executing the processor-executable instructions that cause the device to:
    receive via use of the digital camera an image data;
    determine from the image data that a user is gazing at the intelligent personal assistant via the digital camera;
    receive an audio utterance from the user via the microphone; and
    provide the audio utterance to a cloud-based server via the network interface for processing without regard to whether a wake word was provided to the device via use of the microphone within a first period of time prior to the audio utterance being received by the device when the audio utterance is received by the device during a second period of time that includes the user having been determined to be gazing at the device.
9. The device of claim 8, further comprising a speaker and additional processor-executable instructions that cause the device to:
    prior to determining that a user is gazing at the device:
    monitor a data received via the microphone for utterance of a wake word;
    determine from the data that the user has uttered the wake word; and
    provide via use of the speaker a response to a phrase spoken by the user and received via use of the microphone after the user has uttered the wake word.
10. The device of claim 9, wherein the second period of time comprises
    a predetermined period of time measured from the providing of the response.
11. The device of claim 8, wherein the processor-executable instructions that cause the device to determine that a user is gazing at the device comprises instructions that cause the intelligent personal assistant to:
    determine the presence of two eyes and a mouth within the image data.
12. The device of claim 8, wherein the second period of time comprises
    a predetermined period time.
13. The device of claim 8, further comprising:
    a visual indicator;
    wherein the processor-executable instructions further comprise additional processor-executable instructions that cause the device to:
    cause the visual indicator to illuminate when the intelligent personal assistant is listening for a further audio utterance.
14. The device of claim 8, wherein the processor-executable instructions that cause the device to receive the audio utterance from the user comprises instructions that cause the intelligent personal assistant to:
    monitor a data received via the microphone for a further audio utterance within a predetermined time after determining that the user is gazing at the intelligent personal assistant;
    when the predetermined time has elapsed without receipt of the further audio utterance, requiring the wake word to be re-provided to the device before allowing the device to provide any subsequently received audio utterance to the cloud-based server via use of the network interface for processing.

* * * * *